(12) United States Patent
Bossecker et al.

(10) Patent No.: US 7,125,039 B2
(45) Date of Patent: Oct. 24, 2006

(54) OCCUPANT PROTECTION DEVICE FOR MOTOR VEHICLES

(75) Inventors: Maximilian Bossecker, Hügelsheim (DE); Ulrich Karlbauer, Ulm (DE); Robert Getz, Ulm (DE); Benedikt Heudorfer, Nersingen (DE)

(73) Assignee: Takata Corporation, Tokyo (JP)

( * ) Notice: Subject to any disclaimer, the term of this patent is extended or adjusted under 35 U.S.C. 154(b) by 89 days.

(21) Appl. No.: 10/623,703

(22) Filed: Jul. 22, 2003

(65) Prior Publication Data

US 2004/0140653 A1   Jul. 22, 2004

(30) Foreign Application Priority Data

Aug. 15, 2002 (DE) ................... 102 37 697
Aug. 2, 1920 (DE) ................... 102 36 374

(51) Int. Cl.
  *B60R 21/16* (2006.01)
(52) U.S. Cl. .................................. 280/730.2
(58) Field of Classification Search ............. 280/730.2, 280/730.1, 733, 728.2
  See application file for complete search history.

(56) References Cited

U.S. PATENT DOCUMENTS

| | | | | |
|---|---|---|---|---|
| 5,226,672 A * | 7/1993 | Husted | ........................ | 280/749 |
| 5,462,308 A * | 10/1995 | Seki et al. | .................... | 280/749 |
| 5,660,414 A * | 8/1997 | Karlow et al. | .............. | 280/749 |
| 6,241,277 B1 * | 6/2001 | Heigl et al. | ............... | 280/730.2 |
| 6,308,982 B1 * | 10/2001 | Wallner et al. | .......... | 280/730.2 |
| 6,312,009 B1 | 11/2001 | H.ang.land et al. | | |
| 6,347,807 B1 | 2/2002 | Schink et al. | | |
| 6,375,216 B1 | 4/2002 | Eschbach | | |
| 6,419,268 B1 * | 7/2002 | Webert | ..................... | 280/743.2 |
| 6,422,593 B1 * | 7/2002 | Ryan | ........................ | 280/730.2 |
| 6,431,588 B1 | 8/2002 | Bayley et al. | | |
| 6,464,250 B1 | 10/2002 | Faigle et al. | | |
| 6,505,853 B1 * | 1/2003 | Brannon et al. | .......... | 280/730.2 |
| 6,634,671 B1 * | 10/2003 | Heigl et al. | .............. | 280/743.2 |
| 2002/0053785 A1 | 5/2002 | Pausch et al. | | |
| 2002/0056974 A1 | 5/2002 | Webert | | |
| 2002/0084633 A1 | 7/2002 | Heigl et al. | | |

FOREIGN PATENT DOCUMENTS

| | | |
|---|---|---|
| DE | 196 54 490 A1 | 6/1998 |
| DE | 100 21 577 A1 | 11/2000 |
| DE | 199 22 994 A1 | 11/2000 |
| DE | 199 26 269 A1 | 12/2000 |
| DE | 200 16 471 U1 | 2/2001 |
| DE | 101 29 581 A1 | 2/2002 |
| DE | 101 39 895 A1 | 3/2002 |
| DE | 101 52 139 A1 | 5/2002 |
| GB | 2 333 075 A | 7/1999 |

* cited by examiner

*Primary Examiner*—Faye M. Fleming
(74) *Attorney, Agent, or Firm*—Foley & Lardner LLP (57) ABSTRACT

An occupant protection device for motor vehicles, having an unfoldable protection element which, when unfolded, forms a curtain for the protection of vehicle occupants, in particular in the head/chest region. A tensioning strap is provided which, when the protection element is unfolded, is tensioned between a first vehicle point and a second vehicle point and in the process forms an obstacle against which the unfolded protection element is supported by means of its outwardly directed rear side.

30 Claims, 11 Drawing Sheets

OCCUPANT PROTECTION DEVICE FOR MOTOR VEHICLES

BACKGROUND

The invention relates to an occupant protection device for motor vehicles.

The side windows of a vehicle provide a hazardous potential for the occupant or individual parts of the occupant's body being flung out of the vehicle should the vehicle overturn. U.S. Pat. No. 6,312,009 B1 (incorporated by reference herein) discloses a head airbag system, in which an airbag is shortened along its lower edge and is thereby tensioned between two fastening points, thus reducing the risk of an occupant being flung out.

DE 100 21 577 A1 and DE 199 26 269 A1 (both documents are incorporated by reference herein in their entireity) disclose protection devices for the head and shoulder region of vehicle occupants, in which tightening of an unfolded airbag, in particular along its lower edge, is brought about via a flexible strap or a tightening string. A similar prior art is also described in the publications DE 101 29 581 A1, DE 199 22 994 A1 and DE 196 54 490 A1 (all three documents are incorporated by reference herein in their entireity).

The concepts known in the prior art have the aim of bringing an airbag under tension after it has unfolded or at least fixing it in place. Since an airbag has an elastic behaviour on account of its chambers, the known clamping systems disadvantageously have to realize a high amount of pretension in order to compensate for the elastic behaviour of the airbag. In particular, the airbag is to be prevented from being able to push outwards in the region of a window. In this situation, there is the risk of a vehicle occupant being flung out of the vehicle.

There is therefore a need for reliable, simple solutions for fitting an airbag or in general a protection element in the vehicle in such a manner that it reliably prevents a vehicle occupant from being flung out of the vehicle.

SUMMARY OF THE INVENTION

According to an embodiment of the present invention, a protection device including a protection element and a tensioning strap are provided. The tensioning strap is configured so that, when the protection element is unfolded, the strap is tensioned between a first vehicle point and a second vehicle point and in the process forms an obstacle against which the unfolded protection element is supported by means of its outwardly directed rear side. The tensioning strap accordingly lies between the protection element and the vehicle structure or between the protection element and a window region of the vehicle structure.

The protection device provides an obstacle or a barrier for the protection element against which the protection element can be supported if there is an outwardly directed force. The provision of a barrier is in principle independent of the manner in which the airbag unfolds, for which reason the device can be used for any desired protection elements and airbag designs. According to certain embodiments of the present invention, unlike in conventional systems, the tensioning strap does not exert any tensile force on the protection element. Its effect lies solely in the provision of a support for the protection element.

The device includes a small number of simple components, namely a tensioning strap and means for fastening and guiding it. Therefore installation can be realized cost-effectively simply and with space-saving benefits. Hard, movable components are avoided. The ability of the tensioning strap to function independently of the protection element enables airbags having a flexible and simple design to be used as protection elements.

The first and second vehicle points, between which the tensioning strap is tensioned, are, in particular, a front and a rear vehicle point. A side-impact protection device is then provided. In principle, however, the tensioning strap may also be tensioned between other vehicle points, for example in the front or rear region of the vehicle, for example in order to support a protection element which unfolds in the region of the windscreen or of the rear window.

A front vehicle point and a rear vehicle point, between which the tensioning strap is tensioned, are preferably a front and a rear pillar. The tensioning element can be tensioned, for example, between the A-pillar and the B-pillar, between the B-pillar and the C-pillar, or between the A-pillar and the C-pillar of a vehicle.

According to an alternative embodiment of the present invention, provision is made for the tensioning strap to only have slight elasticity, if any at all. Such elasticity is specifically not desired, since the obstacle which is provided by the tensioning strap would otherwise be flexible.

The tensioning strap is connected to the protection element in a longitudinally displaceable manner preferably via guide elements which are arranged on the outwardly directed rear side of the protection element. The guide elements are, for example, loops which are fastened to the protection element and through which the tensioning strap runs. It is emphasised here that the connection of the tensioning strap to the protection element does not cause any tensile force to be exerted on the protection element. This would only be possible if the tensioning strap were connected fixedly in the longitudinal direction to the protection element. The connection to the protection element serves merely to hold the protection element on the tensioning strap. This is particularly advantageous if a protection element designed as an airbag becomes damaged. In spite of the damage to the airbag, which leads to the latter becoming slack, the said airbag is held on the tensioned tensioning strap, with the result that the window opening remains securely closed.

In another alternative embodiment, the tensioning strap runs between the rear side of the protection element and a layer of fabric connected to the protection element. Holding of the protection element on the tensioning strap is accordingly not provided by separate guide elements, but by an additional layer of fabric, the tensioning strap running between the outwardly directed rear side of the protection element and the layer of fabric. In this case, the tensioning strap can essentially move freely with respect to the protection element. A tensile force is not exerted on the protection element. The layer of fabric together with the rear side of the protection element forms a type of pocket for the tensioning strap, which pocket may also assume the form of a tube of fabric in accordance with the space required by the tensioning strap when tensioned. By virtue of the fact that the tensioning strap is covered by a layer of fabric, the risk of injury to the occupant is minimized.

According to yet another embodiment of the present invention, provision is made for the tensioning of the tensioning strap to be brought about by the protection element unfolding, the tensioning strap being connected to the protection element at at least one point. The protection element is automatically initialized and therefore causes the protection element to be tensioned. This enables additional triggering devices for tensioning the tensioning strap to be omitted, so that the solution is particularly simple and cost-effective. However, in principle it likewise lies within the scope of the invention to completely uncouple the tensioning of the tensioning strap from the unfolding of the protection element. In this case, for example, separate triggering devices are provided which cause the tensioning strap to be tensioned at a given time in a manner comparable to a gas generator. The tensioning of the tensioning strap can take place in this case together with or slightly staggered in time from the unfolding of the protection element.

To tension the tensioning strap, the tensioning strap preferably extends from a first fastening point via at least one deflecting device to a second fastening point. The fastening points may be fixed on the bodywork or else may be movable. The precise guidance of the strap can take place in diverse ways.

In a first exemplary embodiment, the tensioning strap is connected from a first fastening point in the region of the one vehicle pillar via a first deflecting device in the region of the other vehicle pillar and a second deflecting device in the region of the roof frame to a lower region of the protection element. In this case, when the protection element is unfolded, the tensioning element is tensioned between the first fastening point and the first deflecting device.

In a second exemplary embodiment, the tensioning strap is connected from a first fastening point in the region of the one vehicle pillar via a first deflecting device in the region of the other vehicle pillar, a second deflecting device in the region of the roof frame and a third deflection provided in the protection element to a fastening point in the region of the roof frame. In this case too, the tensioning element is tensioned between the first fastening point and the first deflecting device.

In a third exemplary embodiment, the tensioning strap runs between a first, positionally fixed fastening point in the region of the one vehicle pillar and an essentially vertically running guide in the region of the other vehicle pillar, the tensioning strap being moved downwards along the vertical guide as the airbag unfolds.

In a fourth exemplary embodiment, the tensioning strap runs between a first, essentially vertically running guide in the region of the front vehicle pillar and a second, essentially vertically running guide in the region of the rear vehicle pillar. When the protection element is not unfolded, said tensioning strap lies in the region of the roof frame and, after the protection element is unfolded, is displaced into a downwardly shifted position with respect to it between the two guides. In comparison to the third variant, the two fastening points or ends of the tensioning strap are arranged in a displaceable manner.

In the third and fourth exemplary embodiments, the guide is preferably formed by an essentially vertically running cable which extends between two positionally fixed fastening points. However, the guide may also be formed in another manner, for example by means of a guide rail or the like.

The protection device preferably has a return lock which prevents the tensioned strap from being released or relaxed or loosened. Particularly in the refinements of the invention in which the tensioning of the tensioning strap is brought about by the protection device, this ensures that the tensioning strap remains tensioned even after the protection element or airbag has been slack.

The protection device preferably has a release device for the manual release of the tensioning strap by a vehicle occupant. This makes it possible after an accident for the occupant to leave the vehicle, if appropriate through the window, by releasing the tensioning strap. The release device has, for example, a cutting element for severing the tensioning strap or means for deactivating a return lock. If the tensioning strap comprises two sections which are connected to each other by a connecting device, the release device, when actuated, separates the connection of the two parts. In a further refinement, the release device is an element of a welded or bonded connection. Provision may furthermore be made for the release device to have means for releasing a fastening point or deflecting point of the tensioning strap. Finally, it is also conceivable for the release device to undertake a time-controlled release of the tensioning strap. For example, the tensioning strap is released by an electrically triggered release of the return lock after a certain period of time after the protection element has unfolded.

The unfolding element may be either an inflatable airbag or a non-inflatable sail.

When an airbag is used as protection element, the airbag preferably has at least one essentially vertically running chamber, specifically preferably at least in the region in which the tensioning strap is connected to the airbag. This has the effect that the gas flowing in from above or below rapidly fills the corresponding chamber and the connecting point of the tensioning strap to the airbag rapidly and under high pressure undergoes a vertical, translatory movement to tension the tensioning strap. The more vertical the corresponding chamber runs, the better the chamber is filled and the tensioning strap tensioned, and so the chamber preferably runs perpendicular or virtually perpendicular.

The airbag preferably has a plurality of parallel, vertically running chambers. The individual, parallel and vertically running chambers increase the stability of the unfolded airbag and act in a manner of bending beams. The airbag, when it encounters a horizontally running, tensioned tensioning strap, therefore, with great reliability, does not buckle along the line of contact with the tensioning strap.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Figure 1:
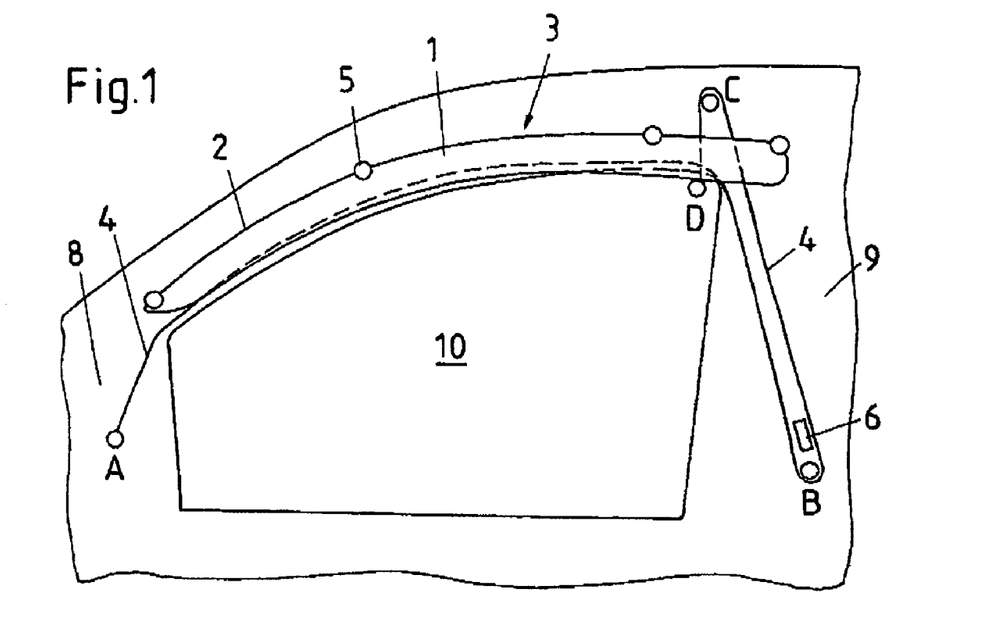
FIG. 1 shows a first exemplary embodiment of a side-impact protection device with a tensioning strap supporting an airbag.

FIG. 1 shows the front, right-hand side window 10 of a motor vehicle, which is formed between the A-pillar 8 and the B-pillar 9 of the vehicle. A folded airbag 1 is situated in a customary airbag covering 2 and extends along the roof frame 3 between the A-pillar and the B-pillar of the vehicle. The airbag 1 is fastened to the roof frame 3 via fastening tabs 5. Furthermore, a tensioning strap 4 is provided, the front end of which is connected fixedly to the vehicle bodywork in the region of the A-pillar 8 at a fastening point A. In the non-activated state which is illustrated, the tensioning strap 4 initially runs along the roof frame 3, is then guided downwards and deflected at a lower deflecting point B arranged in the region of the B-pillar. It then runs to an upper, further deflecting point C arranged in the region of the roof frame 3 and is finally connected by its other end to the airbag 1 at a point D. The tensioning strap 4 is covered, in the same manner as the airbag, by a customary covering and cannot be seen by the vehicle occupant in the non-activated state of the airbag.

The deflecting points B, C are formed by deflecting devices which are fixed on the bodywork and which each have a deflecting roller.

Further elements of an airbag system, such as a gas generator and a gas lance, are likewise present, but not illustrated for the sake of better clarity. These concern customary and conventional elements of an airbag system, which are known to the expert.

Figure 2:
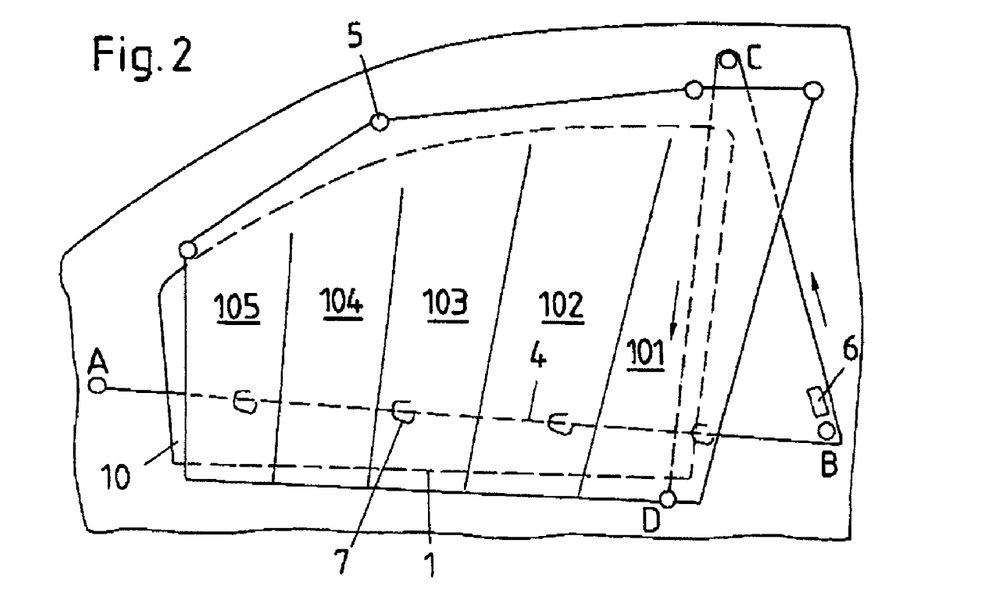
FIG. 2 shows the protection device of FIG. 1 after the airbag is unfolded and the tensioning strap tensioned.

FIG. 2 shows the protection device of FIG. 1 in the activated state, with the airbag 1 unfolded. If, as a result of an activation of the associated gas generator, the airbag 1 unfolds, the connecting point D between the tensioning strap 4 and the airbag 1 moves essentially vertically downwards. As a result, the tensioning strap is tensioned between the fastening point A on the A-pillar 8 and the deflecting point B on the B-pillar 10. A return lock 6, which is formed in the region of the lower deflecting point B, ensures that the tensioning strap 4 remains tensioned even after the airbag has possibly become slack.

The strap 4 is now situated between the outwardly directed rear side of the unfolded airbag and the vehicle window. Since the strap consists of a material which has only slight elasticity, if any at all, it forms a virtually rigid, locked barrier against which the unfolded airbag 1 can be supported by means of its rear side. As is illustrated with reference to FIG. 2, the tensioning strap 4 is held here in guides 7 formed by loops on the outwardly directed rear side of the airbag. However, the tensioning strap 4 can be moved loosely in the loops 7, in particular can be moved longitudinally, with the result that a tensile force is not exerted on the airbag 1 via the tensioning strap 4 and the loops 7.

On the contrary, the tensioned tensioning strap 4 merely provides a support for the airbag 1, preventing the latter from being elastically deformed outwards or even from being pressed out of the window entirely in the event of a force acting in an outward direction on the airbag 1. The tensioning strap 4 constitutes an obstacle or a blockage element for the airbag 1. Although it is tensioned by the unfolding airbag 1, its ability to function is independent of the airbag, in particular does not exert any tensile forces on the airbag in order to tension the latter. Its function is merely passive in the sense that it takes no part in the unfolding of the airbag and merely blocks the unfolded airbag in a certain direction.

The connection of the tensioning strap 4 to the airbag 1 via the loops 7 provided on the outwardly directed rear side of the airbag, although expedient, is not absolutely necessary. The loops 7 provide the same effect as the window opening remaining closed even if an airbag has been damaged and is empty, since the airbag is fastened to the tensioned strap 4. An effective protection against the vehicle occupant or parts of the occupant's body being flung out of the vehicle is therefore provided even if an airbag has been damaged.

The tensioning strap 4 is threaded into the loops 7 of the airbag, for example, after the airbag has been folded and before the airbag is arranged in an airbag covering.

Instead of via loops, the tensioning strap 4 may also be held on the airbag via a layer of fabric. In this case, the tensioning strap runs between the outwardly directed rear side of the airbag and the layer of fabric, i.e. is situated in a type of pocket.

The tensioning strap is, for example, as illustrated in FIG. 1, a cable which is essentially circular in section. In order to provide a wider contact surface for supporting the unfolded airbag, the tensioning strap may also, however, be designed as a relatively wide strap similar to the carrier strap of a rucksack, at least in those subregions which, when the tensioning strap is tensioned, are arranged in the window. A further advantage of a relatively wide design of the tensioning strap is that the risk of it cutting in and possibly causing damage to the airbag is reduced on account of the enlarged supporting surface.

As mentioned above, the tensioning strap has as little elasticity as possible, since, unlike cables and straps used in the prior art, it does not have the object of exerting a tensile stress on an airbag, but rather is to constitute an obstacle which is as inflexible as possible. Numerous materials are conceivable, for example a design made of cloth or a plastic, such as polyamide.

The airbag 1 has a plurality of parallel, virtually vertically running chambers 101, 102, 103, 104, 105 which increase the stability of the unfolded airbag 1. In particular, owing to the increased stability which they provide, the chambers reliably prevent the airbag 1, when it makes contact with the horizontally tensioned tensioning strap 4, from buckling about its line of contact with the tensioning strap 4. Furthermore, it is particularly advantageous that the connecting point D between the tensioning strap 4 and the airbag 1 is also situated in the region of a vertically running chamber 101. The vertical alignment of the chamber 101 ensures that the chamber 101 is rapidly filled with gas and that the chamber 101 rapidly expands vertically downwards under high pressure, so that the connecting point D is also rapidly moved vertically downwards under high pressure and the tensioning strap 4 is tensioned rapidly and at high tension.

Figure 3:
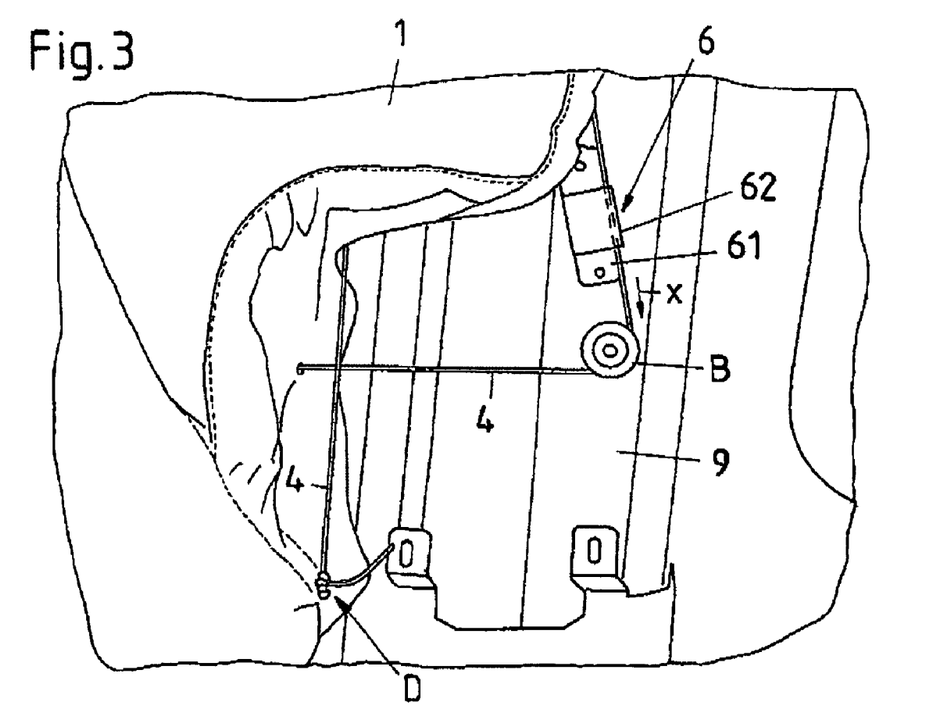
FIG. 3 shows a view of a detail of a return lock of the protection device of FIG. 1.

FIG. 3 shows, in the form of a detailed illustration, the return lock 6 which is arranged adjacent to the lower deflecting point B. The return lock 6 is arranged as close as possible to the deflecting point B, so that the length of the strap 4 between the front fastening point A and the return lock is as short as possible and, correspondingly, the flexibility of the tensioning strap 4 between the points A and B is as small as possible. The return lock 6 is connected fixedly to the B-pillar 9 in a fastening region 61. The actual locking mechanism 62 is provided, for example, by two pivotable parts between which the tensioning strap 4 runs and which clamp the latter between them when a force occurs in the direction X (not illustrated separately). Return locks are known per se to the expert.

In FIG. 3, the connecting point D between the tensioning strap 4 and the airbag 1 can readily be seen. The connection takes place, for example, by knotting the end of the tensioning strap 4 to a loop of the airbag 1.

Figure 4:
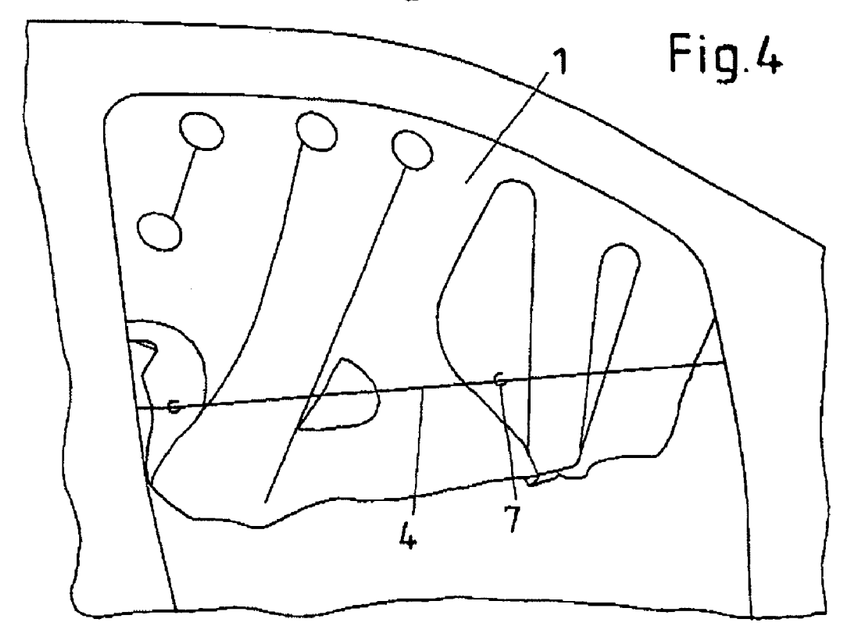
FIG. 4 shows the protection device of FIG. 1 after the airbag is unfolded and the tensioning strap is tensioned, in a view from the outside of the vehicle.

FIG. 4 shows the protection device with the airbag 1 unfolded and tensioning strap 4 tensioned, in a view from the outside of the vehicle (and with the door open). It can readily be seen that the tensioning strap 4, which is fastened in a longitudinally movable manner to the outwardly directed rear side of the airbag 1 by means of loops 7, constitutes an obstacle for the airbag which prevents the latter from moving out of the window opening.

Figure 5:
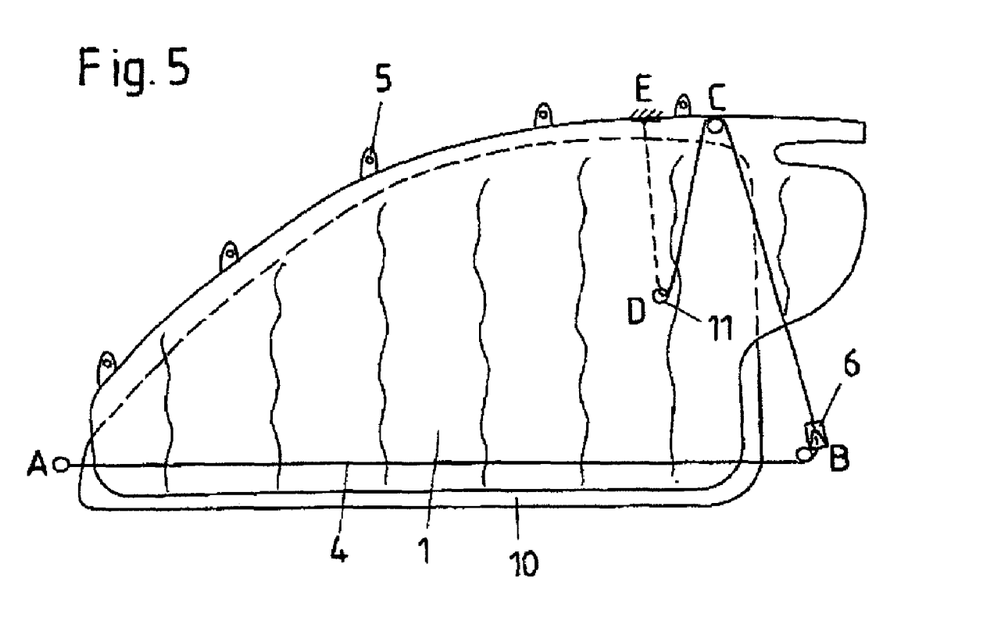
FIG. 5 shows a second exemplary embodiment of a protection device with a tensioning strap supporting an airbag.
Figure 6:
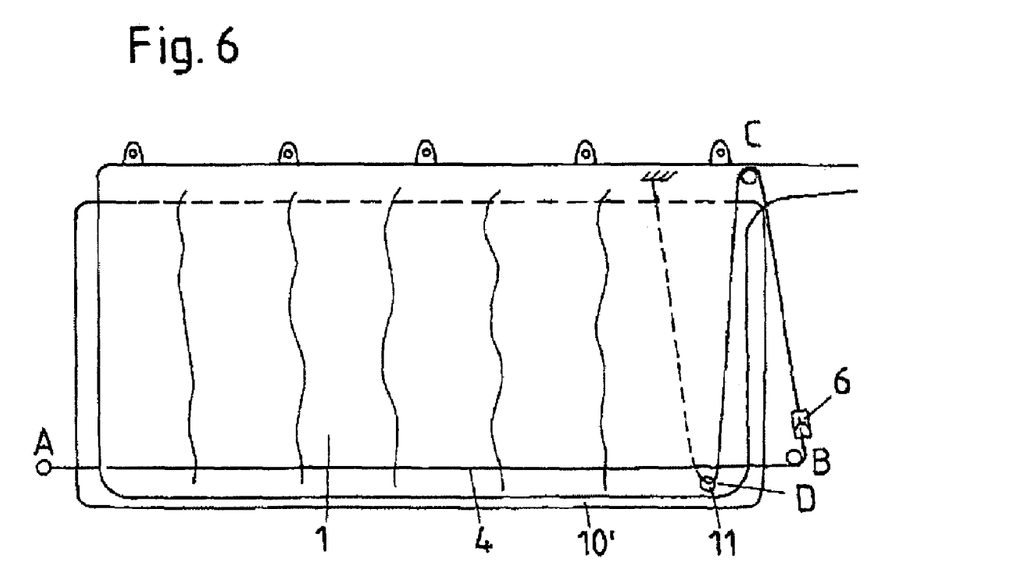
FIG. 6 shows the protection device of FIG. 5, an essentially rectangular window being secured.

In FIGS. 5 and 6, a further exemplary embodiment is illustrated, in which the tensioning strap 4 is not connected at its end to the airbag 1 at the point D, but rather merely undergoes a renewed deflection at a cutout 11 of the airbag 1. The end of the tensioning strap 4 is fastened to a further fastening point E in the region of the roof frame. The arrangement is similar to an upside-down block and tackle. It has the effect of even more sharply tightening the strap 4. This makes it possible to position the horizontally running tensioning line between the points A and B at a lower point. This has the advantage that, in the event of the airbag being damaged, the entire window region is secured by the tensioning strap 4, at least if the airbag is connected to the tensioning strap via loops on the outwardly directed rear side. FIG. 6 shows the protection device of FIG. 5 when securing an essentially rectangular window 10', for example between the B-pillar and the C-pillar.

Figure 7:
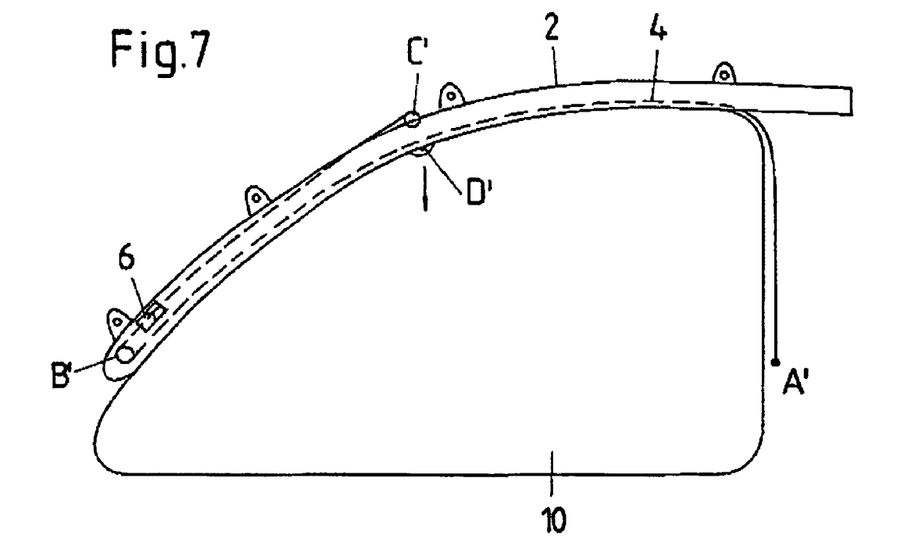
FIG. 7 shows a third exemplary embodiment of a protection device with a tensioning strap supporting an airbag.
Figure 8:
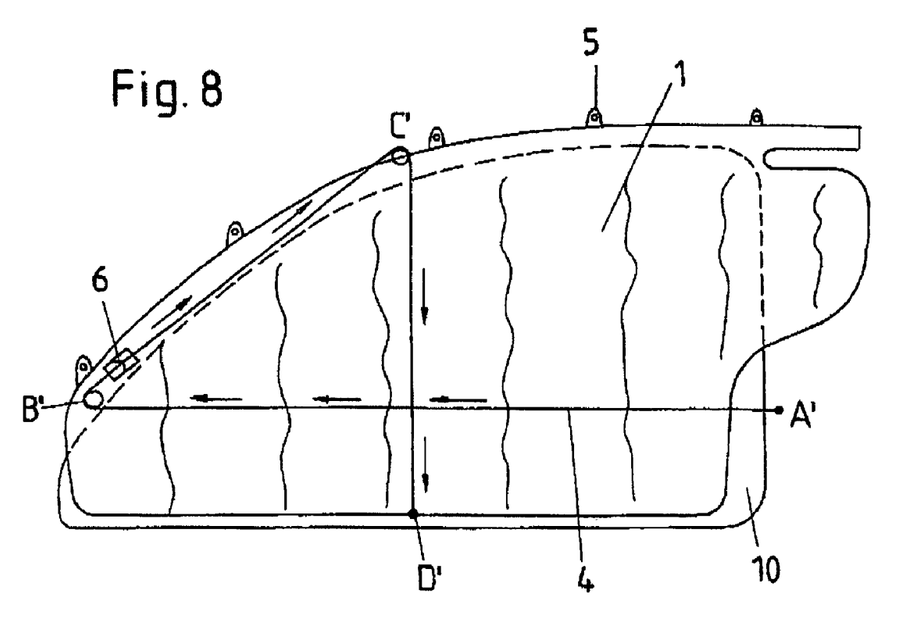
FIG. 8 shows the protection device of FIG. 7 with the airbag unfolded and tensioning strap tensioned.

The exemplary embodiment shown in FIGS. 7 to 8 corresponds essentially to the refinement of FIGS. 1 to 4, an arrangement of the tensioning strap 4 which is mirror-inverted with respect to FIGS. 1 to 4 being provided. The tensioning strap 4 is thus conducted from a fastening point A', which is fastened to the B-pillar, via the roof frame to a deflecting point B', which is fastened to the A-pillar, and on from said deflecting point to a second deflecting point C', which is arranged in the region of the roof frame, and is then fastened by its end to the airbag 1 at point D'. FIG. 8 shows the protection device with the airbag unfolded and strap tensioned. The direction of the forces which are applied is indicated by arrows. The function is identical to the function described with reference to FIGS. 1 to 4.

Figure 9:
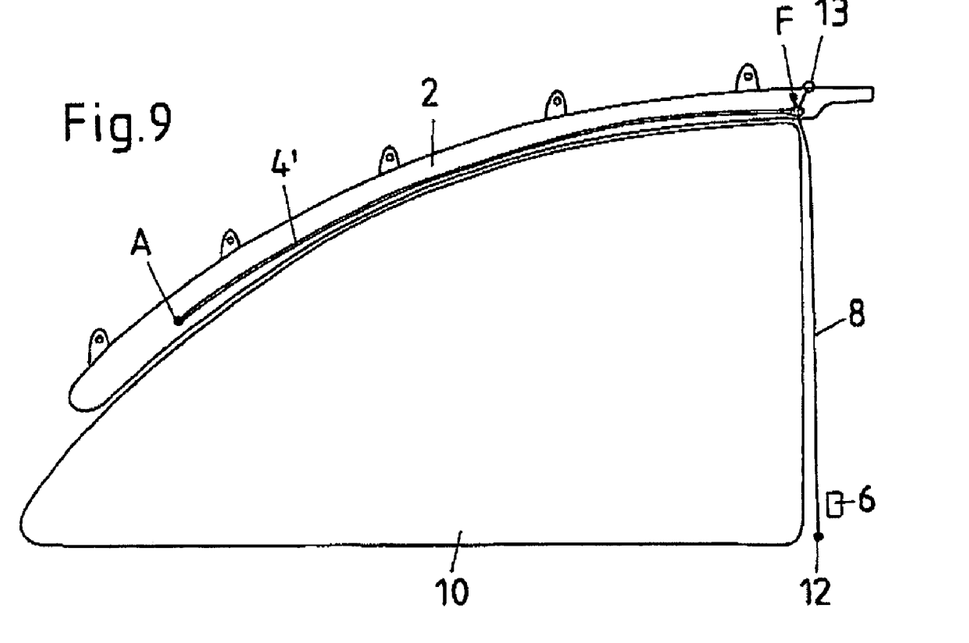
FIG. 9 shows a fourth exemplary embodiment of a protection device with a tensioning strap supporting an airbag.
Figure 10:
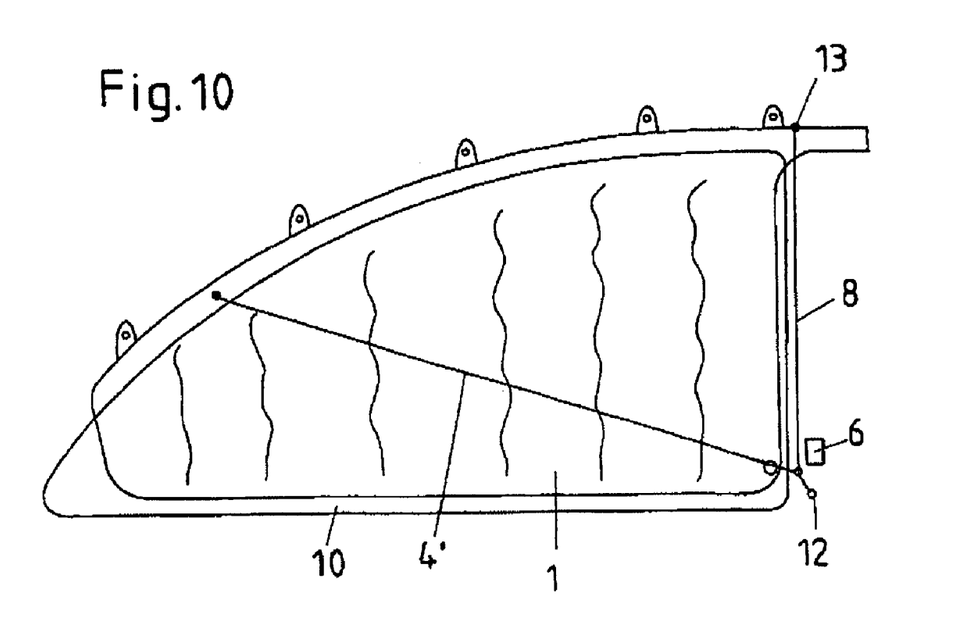
FIG. 10 shows the protection device of FIG. 9 with the airbag unfolded and tensioning strap tensioned.

FIGS. 9 and 10 show a further exemplary embodiment which is distinguished by a particularly simple refinement. The tensioning strap 4' is designed here as a strap which is fastened at its one end A in the region of the A-pillar or else of the front roof frame to the vehicle bodywork. The other end F of the tensioning strap 4' is connected in the region of the B-pillar to an essentially vertically running guide 8. The connection takes place via a loop. At the same time, the tensioning strap 4' is connected to the airbag 1 at the or in the vicinity of the fastening point F, for example likewise via a loop or via an eyelet. According to FIG. 10, when the airbag 1 is unfolded, the tensioning strap 4' is moved downwards by the unfolding airbag 1 along the guide 8. This causes the tensioning strap 4' to be tightened. In this case, a return lock 6 (illustrated schematically) is provided which prevents the tensioning strap 4' from moving upwards again along the guide 8.

The return lock may also be attached directly to the loop F instead of to the bodywork.

In the exemplary embodiment of FIGS. 9 and 10, the guide is designed as a strap running vertically between two fastening points 12, 13. In principle, however, other guide devices, for example a rail guide, may also be provided.

The front fastening point A of the tensioning strap 4' is preferably situated approximately halfway up the window 10, so that the tensioned tensioning strap 4' runs transversely through the window opening. In this embodiment, the tensioning strap 4' is not connected to the airbag via loops. Since the tensioning strap obliquely covers the window which is to be protected, it constitutes a secure obstacle for the airbag 1, which is supported by means of its outwardly directed rear side on the tensioning strap 4'.

Figure 11:
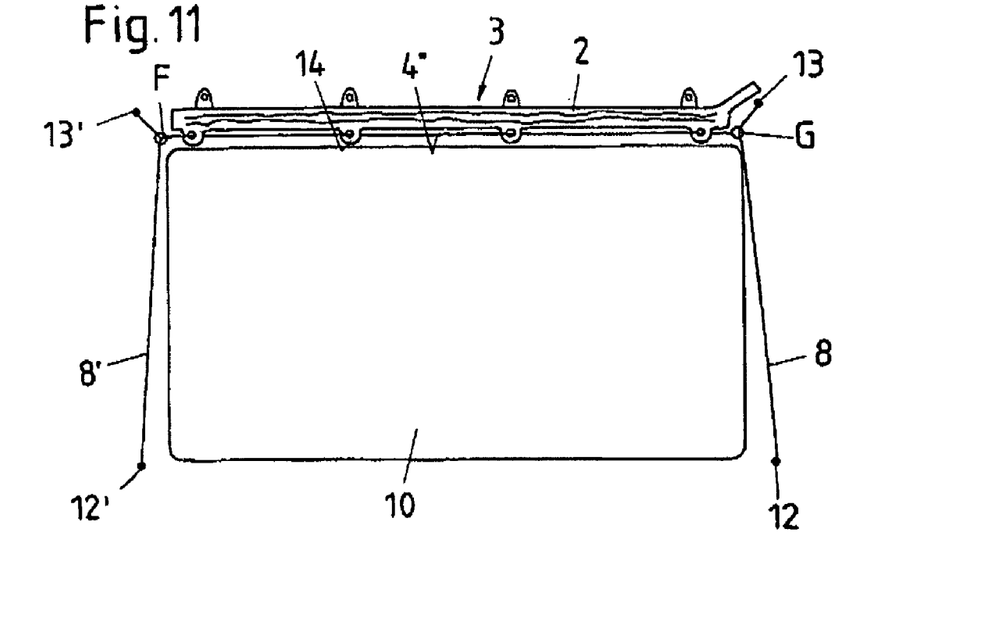
FIG. 11 shows a fifth exemplary embodiment of a protection device with a tensioning strap supporting an airbag.
Figure 12:
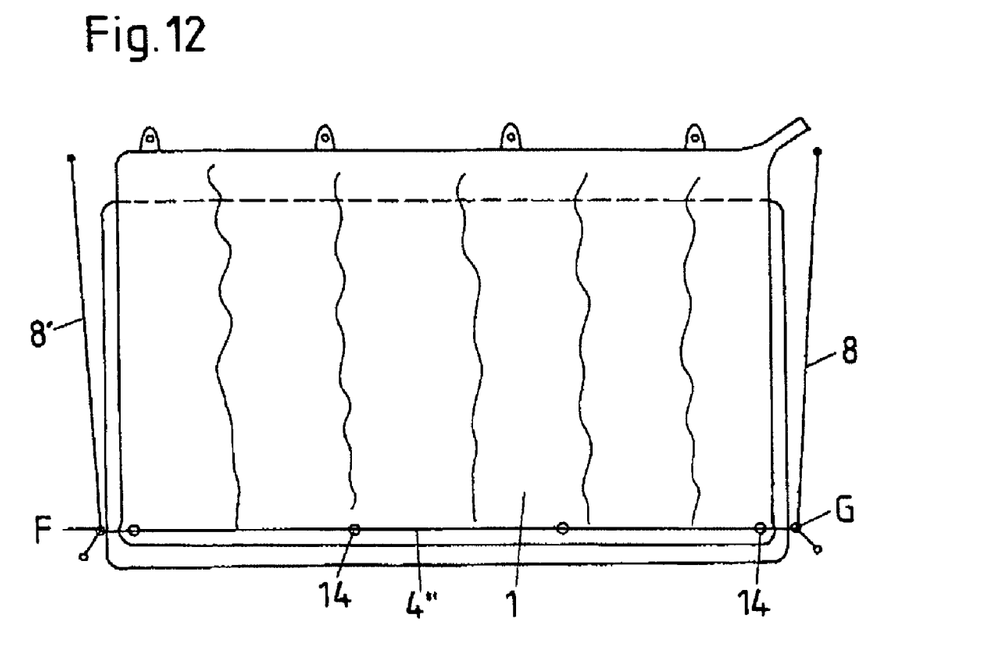
FIG. 12 shows the protection device of FIG. 11 with the airbag unfolded and tensioning strap tensioned.

The exemplary embodiment of FIGS. 11 and 12 constitutes a development of the exemplary embodiment of FIGS. 9 and 10 in so far as the two ends F, G of the tensioning strap 4" can now be displaced in the vertical direction along guides 8, 8'. The vertical guides 8, 8' run, for example, along a central B-pillar and a rear C-pillar. In the exemplary embodiment illustrated, the guides 8, 8' are again designed as a vertically running strap which is tensioned between two points 12, 13, 12', 13' fixed on the bodywork. In principle, however, the guides may also be designed in another manner. In the state of the airbag in which it has not been unfolded, the tensioning strap 4" is arranged in the roof frame 3. Its two ends F, G are connected, on the one hand, to one of the vertical guides 8, 8' in each case via loops. Furthermore, the tensioning strap is connected at a number of points to the airbag 1 via loops or eyelets 14.

In the event of being triggered, the tensioning strap 4" is moved downwards along the guides together with its movable end points F, G by the unfolding airbag 1. In this case, the tensioning strap 4" is connected loosely to the airbag 1 via the eyelets 14.

In a further variation of the disclosed exemplary embodiment, the guides 8, 8' in each case run obliquely, specifically in such a manner that the distance between the guides slightly increases in the downward direction. The effect achieved by this is that the tensioning element 4" can be initially mounted relatively loosely in the roof lining and is then increasingly tensioned as it is increasingly displaced downwards.

Figure 13:
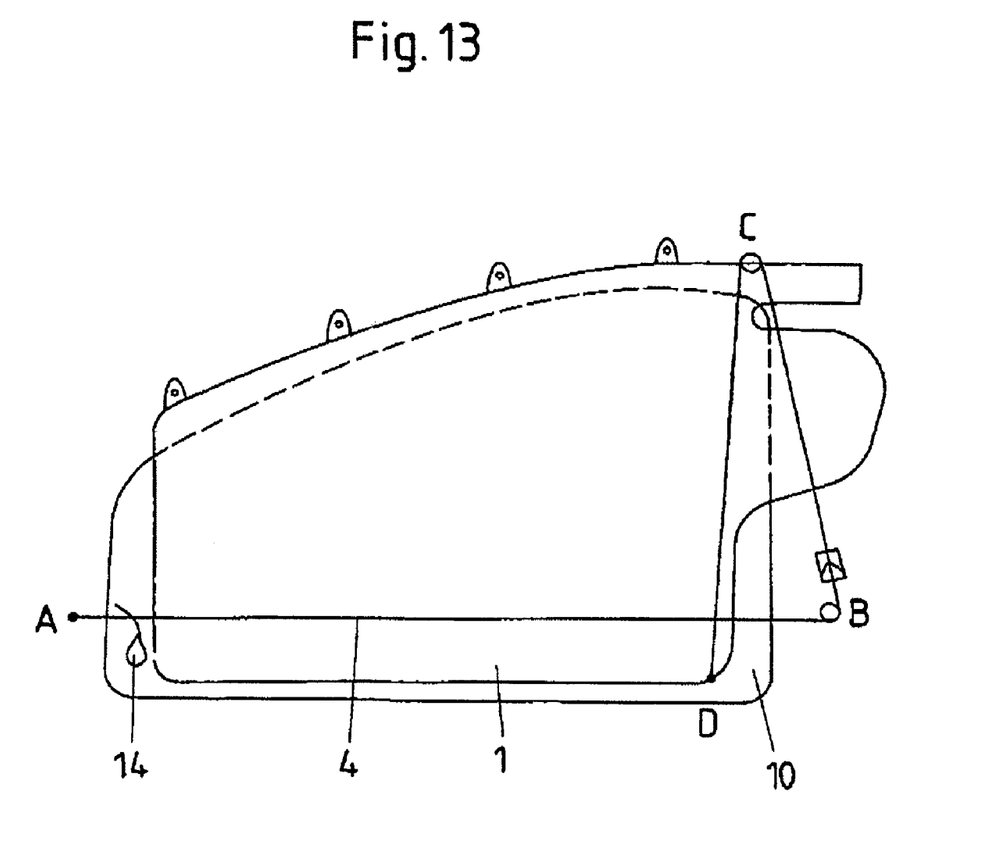
FIG. 13 shows an exemplary embodiment of a side-impact protection device with a tensioning strap supporting the airbag, the protection device having a release device (illustrated schematically) for loosening the tensioned tensioning strap.

FIG. 13 shows a protection device according to FIG. 1, a release device 14 additionally being illustrated schematically. The release device 14 is attached, in particular, adjacent to the fastening point A or B and makes it possible for an occupant to release the tensioned tensioning strap 4 in order to be able to leave the vehicles through the window opening in the event of an emergency.

The release device is preferably provided with a symbol and/or a label (for example PRESS, PULL) in order to draw attention to the release possibility. The release device is also fitted so that it appears through the unfolded airbag. In addition, it is best positioned in such a manner that it can be seen equally well from the inside and from the outside of the vehicle. The release device may vary greatly in design. It may act directly on the tensioning strap or cause the return lock to be deactivated, in the first case the cable, as a rule, being severed and in the second case the cable being released again.

Figure 14:
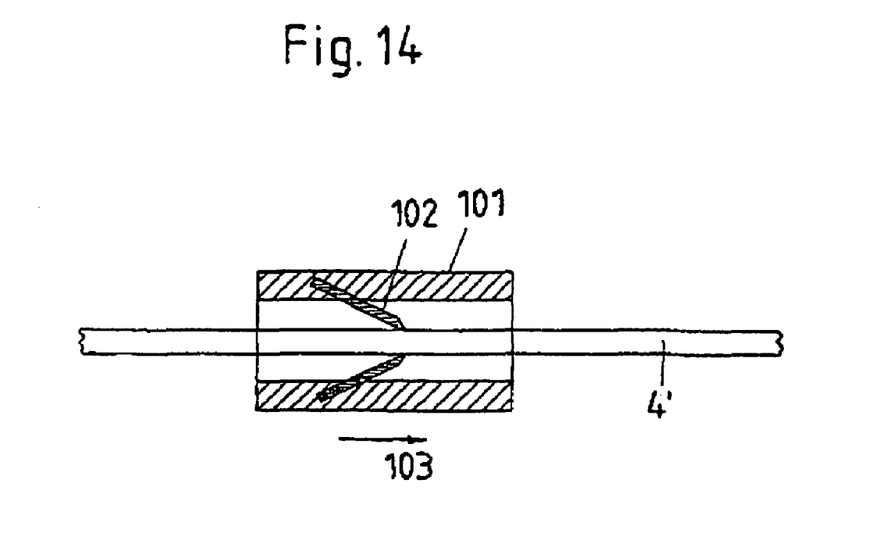
FIG. 14 shows a first exemplary embodiment of a release device, the release device having a cutting element for severing the tensioning strap.

A first exemplary embodiment of a release device of this type is illustrated in FIG. 14. According to this, the release device is designed as a slide 101 having two integrated cutting elements 102. Displacement of the slide 101 in the release direction 103 causes the strap 4 to be severed by the cutting elements 102.

Figure 15:
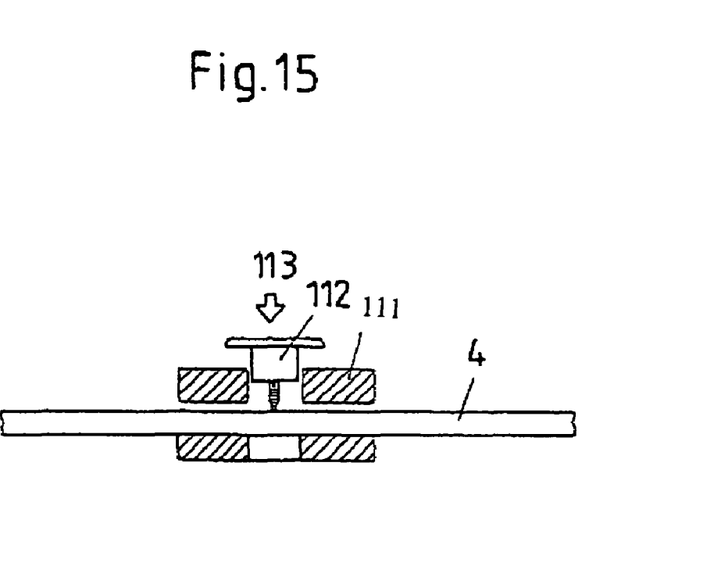
FIG. 15 shows a second exemplary embodiment of a release device, the release device having a pushbutton with an integrated cutting element.

In the embodiment disclosed in FIG. 15, the release device has a retaining element 111, which is fastened to the tensioning strap 4, with a pushbutton 112 with an integrated cutting element, the tensioning strap 4 again being severed when the pushbutton 112 is actuated in the release direction 113.

Figure 16:
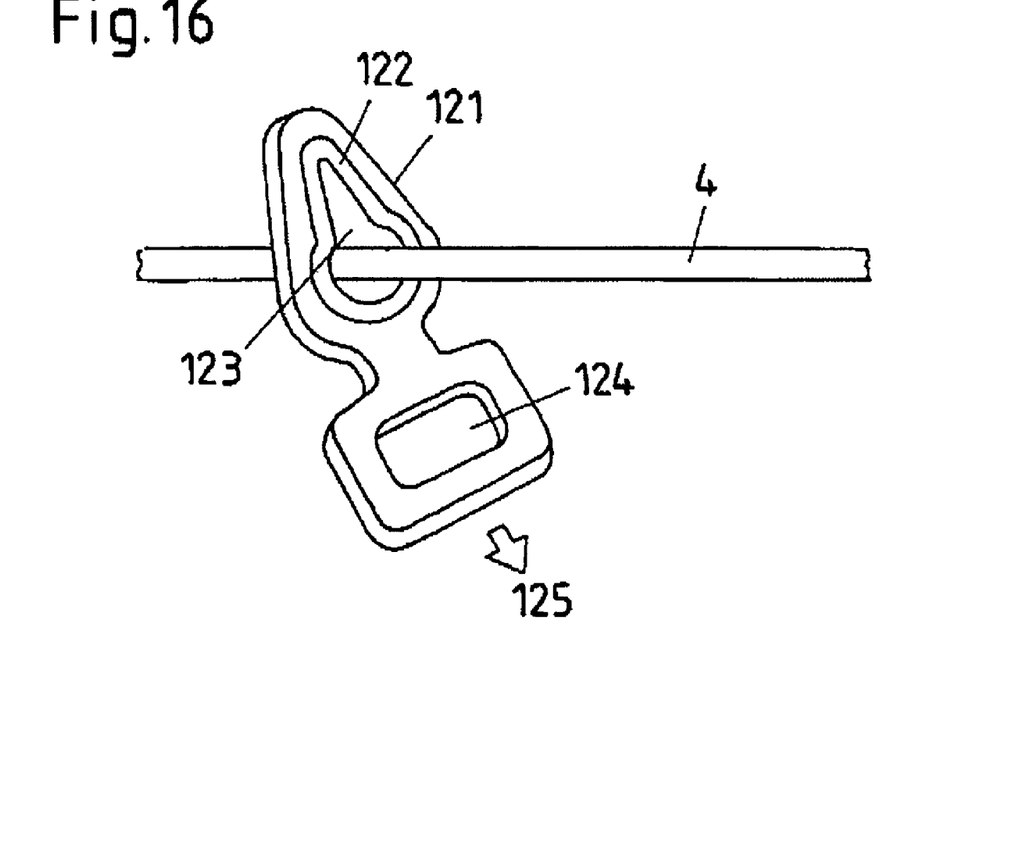
FIG. 16 shows a third exemplary embodiment of a release device, the release device forming a tapering cutting element.

According to FIG. 16, a cutting element 121 is provided for severing the tensioning strap, said cutting element having a first cutout 123, which is provided with a cutting edge 122, and a second cutout 124 serving to make it easier to grasp. The cutout 123 which is provided with the cutting edge 122 has a tapering region, so that the tensioning strap 4, when pulled in the release direction 125, is severed by the cutting element 122.

Figure 17:
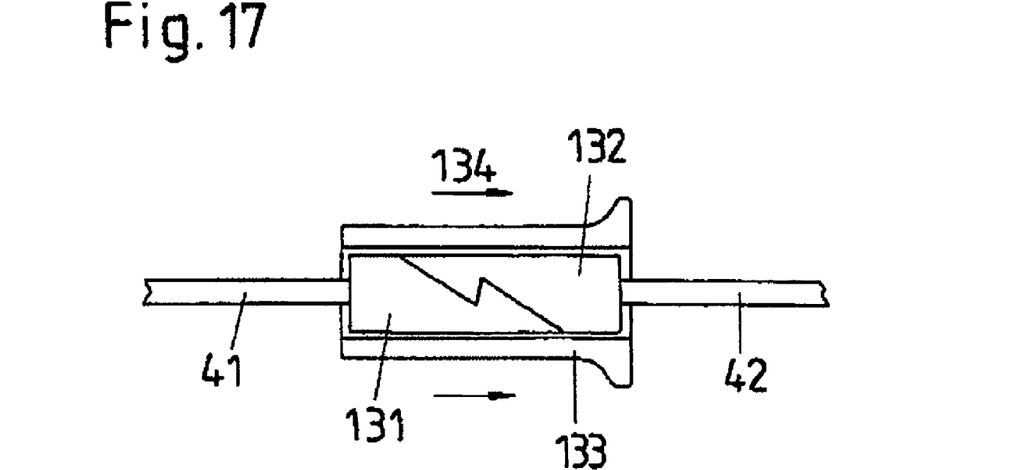
FIG. 17 shows a fourth exemplary embodiment of a release device, the release device comprising a securing sleeve which secures two ends of the tensioning strap which are connected to each other.

FIG. 17 shows an exemplary embodiment, in which the tensioning strap has sections 41, 42 which are connected to each other. Each section is connected to a positive-locking element 131, 132 which are secured by a securing sleeve 133. Displacement of the securing sleeve 133 in the release direction 134 enables the two positive-locking elements 131, 132, and therefore also the two sections 41, 42, to be separated.

Figure 18:
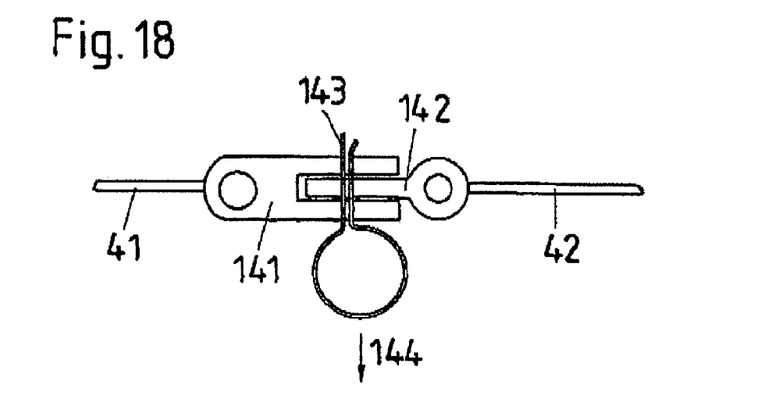
FIG. 18 shows a fifth exemplary embodiment of a release device, the release device comprising a securing pin for releasing two parts of the tensioning strap which are connected to each other.

In the exemplary embodiment of FIG. 18, again two sections 41, 42 are provided which are connected in each case by interengaging structures 141, 142 which are held together by a securing pin 143. Removal of the securing pin 143 in the release direction 144 enables the two sections 41, 42 to be separated from each other.

Figure 19:
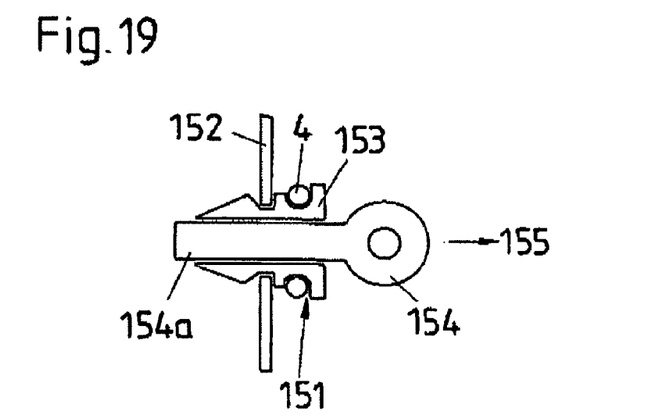
FIG. 19 shows a sixth exemplary embodiment of a release device, the release device having a securing pin for releasing a fastening or deflecting point of the tensioning strap on the vehicle bodywork.

In the exemplary embodiment of a release device illustrated in FIG. 19, the tensioned strap 4 is released by a deflecting point or fastening point of the strap 4 being released. The deflecting point is formed by a groove 151 in a plug 153 which is fastened in the vehicle bodywork 152. The plug 153 is secured by a securing pin 154 which passes centrally through the plug 153 and has a cylindrical region 154a. When the securing pin 154 is pulled out in the release direction 155, the ends of the plug 153 which are inserted in the vehicle bodywork can be pulled out of the corresponding opening in the vehicle bodywork, so that the fastening point or the deflecting point is released.

Figure 20:
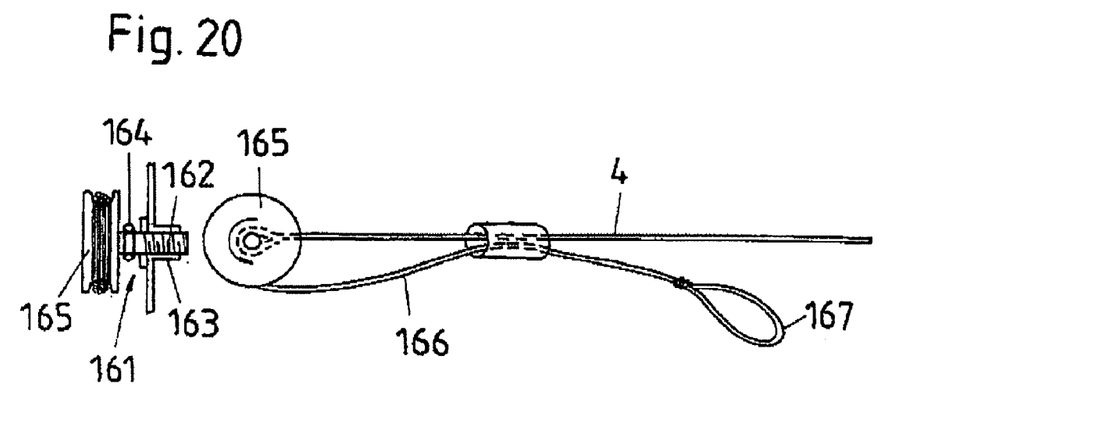
FIG. 20 shows a seventh exemplary embodiment of a release device, the release device having means for unscrewing a fastening bolt from a thread.

The release device illustrated in FIG. 20 likewise makes provision for a fastening or deflecting point of the tensioning strap 4 to be released. The fastening point 161 has a threaded bolt 162 which is inserted into a corresponding opening 163 in the vehicle bodywork. That region of the fastening point which protrudes out of the opening 163 has, firstly, a deflection or fastening 164 for the tensioning strap 4. Furthermore, a roller 165 having a release cord 166 wound on it is provided. Pulling on the loop 167 of the release cord 166 makes it possible for the threaded bolt 162 to be unscrewed from the opening 163 on the bodywork, so that the fastening point 161 is released.

Figure 21:
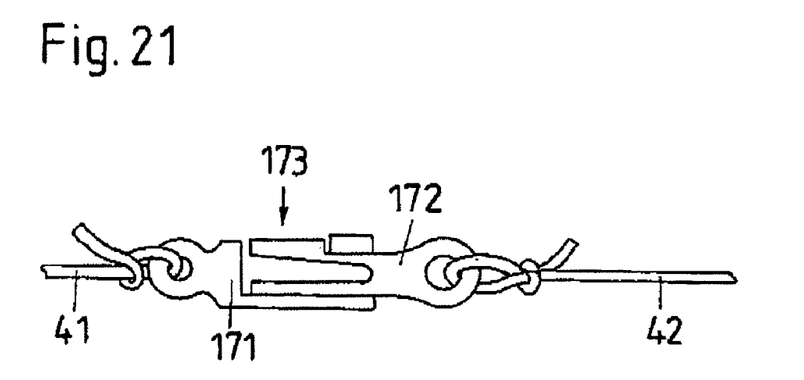
FIG. 21 shows an eighth exemplary embodiment of a release device, the release device having means for releasing the connection of two plastic parts which are connected to each other and which connect two sections of the tensioning strap to each other.

In the exemplary embodiment of a release device which is illustrated in FIG. 21, the tensioning strap again has two sections 41, 42. The two sections are respectively connected to two plastic parts 171, 172 which form a conventional snap-type lock, as is used, for example, in the case of a rucksack. Pressing on the one plastic part in the release direction 173 causes the two plastic parts, and therefore the two sections 41, 42, to be separated.

Figure 22:
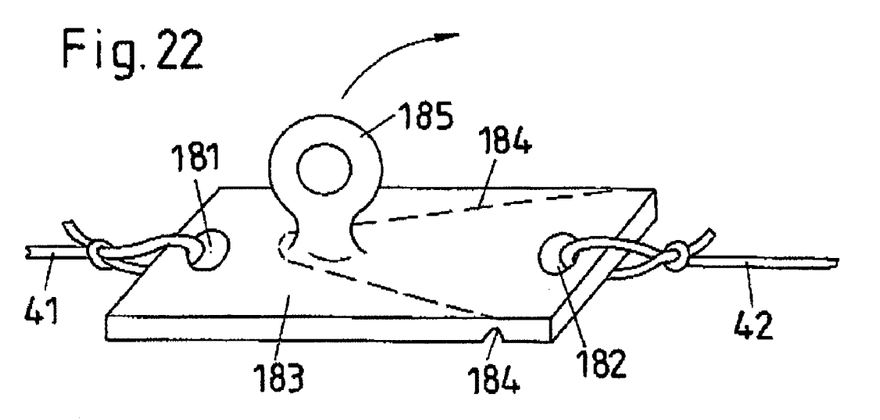
FIG. 22 shows a ninth exemplary embodiment of a release device, the release device having a release tab for undoing a connecting part which connects two ends of the tensioning strap.

FIG. 22 shows a release device which is based on a similar principle as the opening of a drinks can. Two cable sections 41, 42 are connected by their ends to eyelets 181, 182 of a connecting part 183. The connecting part has a weak point 184. A protruding tear-open tab 185 is used to peel off the connecting part 183 along its weak point 184, so that the connecting part 183 disintegrates into two elements.

Figure 23:
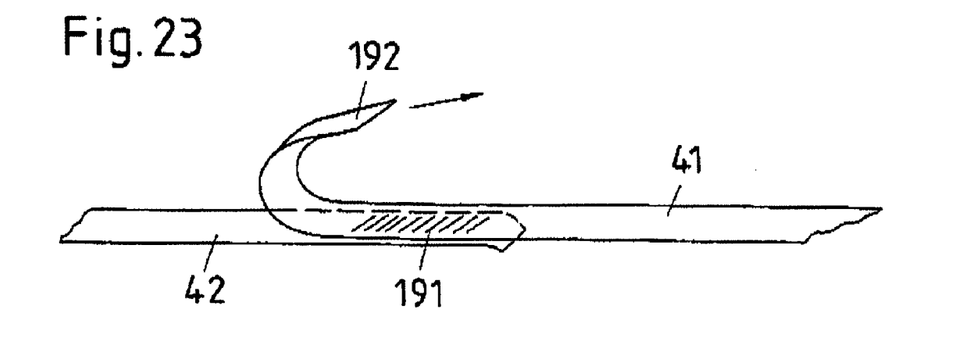
FIG. 23 shows a tenth exemplary embodiment of a release device, the release device comprising a tab for releasing a welded connection or touch-and-close connection.

Finally, FIG. 23 shows an exemplary embodiment in which the tensioning strap is not designed as a cable, but rather as a strap of a certain width. The tensioning strap again forms two separate sections 41, 42. The latter are connected to each other at their ends via a welded connection or a touch-and-close fastener 191. The welded connection or the touch-and-close fastener is extremely tear-resistant to forces occurring in the longitudinal direction. If a tear-open tab 192 is pulled, in which case a force is exerted on the welded connection or on the touch-and-close fastener 191 transversely with respect to the longitudinal direction, the existing connection is, however, easy to separate.

In a further exemplary embodiment of the present invention, the connection between two sections of the tensioning strap may take place by means of a seam which can be pulled open via a pulling element in a manner similar to a ladder in a pair of tights.

The priority applications, German Patent Application Nos. DE 102 36 374.9 filed Aug. 2, 2002 and DE 102 37 697.2 filed Aug. 15, 2002, are hereby incorporated by reference herein in their entireties.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An occupant side-impact protection device for a motor vehicle, the device comprising:
    at least one unfoldable protection element which, when unfolded, forms a curtain for protection of the head and chest region of the occupant; and
    a tensioning strap configured so that, when the protection element is unfolded, the strap is tensioned between a first point located toward a front portion of the protection element and a second point located toward a rear portion of the protection element, the first point being a fastening point and the second point being a deflection element and the strap forms an obstacle against which an outwardly directed rear side of the unfolded protection element is supported,
wherein the tensioning strap is configured to form a continuous strap without forming branching arms.

2. The device of claim 1, wherein the tensioning strap is non-elastic.

3. The device of claim 1, wherein the tensioning strap is connected to the protection element in a longitudinally displaceable manner via guide elements which are arranged on the outwardly directed rear side of the protection element.

4. The device of claim 3, wherein the guide elements comprise loops which are fastened to the protection element and through which the tensioning strap runs.

5. The device of claim 1, wherein the tensioning strap runs in a tube of fabric formed between the rear side of the protection element and a layer of fabric connected to the protection element.

6. The device of claim 1, wherein strap is configured so that the tensioning of the tensioning strap is brought about by the protection element unfolding, the tensioning strap being connected to the protection element at at least one point.

7. The device of claim 6, wherein the tensioning strap extends from a first fastening point via at least one deflecting device to a second fastening point.

8. The device of claim 6, wherein the tensioning strap is connected from a first fastening point in the region of the one vehicle pillar via a first deflecting device in the region of the other vehicle pillar and a second deflecting device in the region of the roof frame to a lower region of the protection element.

9. The device of claim 6, wherein the tensioning strap is connected from a first fastening point in the region of the one vehicle pillar via a first deflecting device in the region of the other vehicle pillar, a second deflecting device in the region of the roof frame and a third deflection provided in the protection element to a fastening point in the region of the roof frame.

10. The device of claim 6, wherein the tensioning strap runs between a first, positionally fixed fastening point in the region of the one vehicle pillar and an essentially vertically running guide in the region of the other vehicle pillar, the tensioning strap being moved downwards along the vertical guide as the protection element unfolds.

11. The device of claim 6, wherein the tensioning strap runs between a first, essentially vertically running guide in the region of the front vehicle pillar and a second, essentially vertically running guide in the region of the rear vehicle pillar, and, in this case, when the protection element is not unfolded, runs in the region of the roof frame and, after the protection element is unfolded, runs in a downwardly shifted position with respect to it between the two guides.

12. The device of claim 10, wherein the guide is formed by an essentially vertically running cable or a guide rail.

13. An occupant side-impact protection device for a motor vehicle, the device comprising:
    at least one unfoldable protection element which, when unfolded, forms a curtain for protection of the head and chest region of the occupant, and a tensioning strap configured so that, when the protection element is unfolded, the strap is tensioned between a first vehicle point and a second vehicle point and forms an obstacle against which an outwardly directed rear side of the unfolded protection element is supported, and
    a return lock which prevents the tensioned strap from being released or relaxed.

14. The device of claim 1, wherein the tensioning strap comprises a cable.

15. The device of claim 1, wherein the tensioning strap is formed at least in subregions as a strap of a certain width.

16. An occupant side-impact protection device for a motor vehicle, the device comprising:
    at least one unfoldable protection element which, when unfolded, forms a curtain for protection of the head and chest region of the occupant, and a tensioning strap configured so that, when the protection element is unfolded, the strap is tensioned between a first vehicle point and a second vehicle point and forms an obstacle against which an outwardly directed rear side of the unfolded protection element is supported, and
    a release device for the manual release of the tensioning strap by a vehicle occupant.

17. The device of claim 16, wherein the release device has a cutting element for severing the tensioning strap.

18. The device of claim 16, wherein the release device has means for deactivating a return lock.

19. The device of claim 16, wherein the tensioning strap comprises two sections which are connected to each other by a connecting device, the release device, when actuated, separating the connection of the two parts.

20. The device of claim 16, wherein the release device has a securing pin by means of which the connecting device is released.

21. The device of claim 16, wherein the release device is an element of a welded or bonded connection.

22. The device of claim 16, wherein the release device has means for releasing a fastening point or deflecting point of the tensioning strap.

23. The device of claim 16, wherein the release device undertakes a time-controlled release of the tensioning strap.

24. The device of claim 1, wherein the unfolding element is an airbag or a sail.

25. The device of claim 24, wherein the airbag has at least one essentially vertically running chamber.

26. The device of claim 6, wherein the airbag has an essentially vertically running chamber at least in the region in which the tensioning strap is connected to the airbag.

27. The device of claim 25, wherein the airbag has a plurality of parallel, vertically running chambers.

28. The device of claim 1, wherein the first point is a vehicle front pillar and the second point is a vehicle rear pillar.

29. The device of claim 1, wherein a portion of the strap adjacent the protection element is positioned only between the protection element and a window region.

30. An occupant side-impact protection device for a motor vehicle, the device comprising:
- at least one unfoldable protection element which, when unfolded, forms a curtain for protection of the head and chest region of the occupant; and
- a tensioning strap configured so that, when the protection element is unfolded, the strap is tensioned between a first point located toward a front portion of the protection element and a second point located toward a rear portion of the protection element and the strap forms an obstacle against which an outwardly directed rear side of the unfolded protection element is supported, wherein the tensioning strap is configured to form a continuous strap without forming branching arms, and wherein the tensioning strap is configured so that the tensioning of the tensioning strap is brought about by the protection element unfolding, the tensioning strap being connected to the protection element at at least one point.

* * * * *